July 14, 1942.   J. Y. BLAZEK   2,289,693
BRAKE LINING GRINDER
Filed March 26, 1940   2 Sheets-Sheet 1

INVENTOR.
JOHN Y. BLAZEK
BY
ATTORNEYS.

July 14, 1942.　　　J. Y. BLAZEK　　　2,289,693
BRAKE LINING GRINDER
Filed March 26, 1940　　　2 Sheets-Sheet 2

INVENTOR.
JOHN Y. BLAZEK
BY
ATTORNEYS.

Patented July 14, 1942

2,289,693

UNITED STATES PATENT OFFICE 2,289,693

BRAKE LINING GRINDER

John Y. Blazek, Bedford, Ohio, assignor to Lempco Products, Inc., Bedford, Ohio, a corporation of Ohio Application March 26, 1940, Serial No. 325,994

12 Claims. (Cl. 51—124)

This invention relates generally, as indicated, to a brake lining grinder and has reference more specifically to a brake lining grinder adapted for grinding brake lining after the same is secured to a cast brake shoe.

A pressed brake shoe as contrasted with a cast brake shoe, generally speaking, is lighter, certain dimensions thereof can be more accurately and uniformly controlled and the radial flange thereof is narrower and thinner. With respect to said dimensions, particular attention is directed to the degree of control which it is possible to exercise when working with pressed shoes which is not obtainable when working with cast shoes.

Hitherto it has been the practice in mounting upon a device of the type described a newly lined brake shoe to locate the same from the axle adjacent or inside surface of the axial flange of the brake shoe. As has been above indicated, the dimensions from this inside surface to the opposite surface of a cast brake shoe varies and this dimension varies from shoe to shoe even though the shoes under consideration are cast by one foundry to meet one set of specifications. In mounting cast brake shoes for grinding the lining thereon, further difficulty is encountered by the frequent presence of reinforcing ribs.

In order to secure efficient braking, the brake lining should be of the same radius as is the brake drum. For this reason it is necessary to grind the lining when it is originally installed or when for any reason it becomes out of round.

The primary object of this invention has been to provide a brake lining grinder which will grind brake lining to a true cylinder after the same has been secured to a brake shoe.

Another object of this invention has been to provide a device of the character described which will quickly and accurately maintain a cast shoe and grind brake lining secured thereto.

Still another object has been to provide efficient and accurate brake shoe locating means.

A still further object of this invention has been to provide means for utilizing a greater radial portion of a rotating grinding surface than has heretofore been possible in brake lining grinders.

To the accomplishment of the foregoing and related ends, said invention, then, consists of the means hereinafter fully described and particularly pointed out in the claims; the annexed drawings and the following description setting forth in detail certain structure embodying the invention, such disclosed structure constituting, however, but one of various structural forms in which the principle of the invention may be used.

Figure 1:
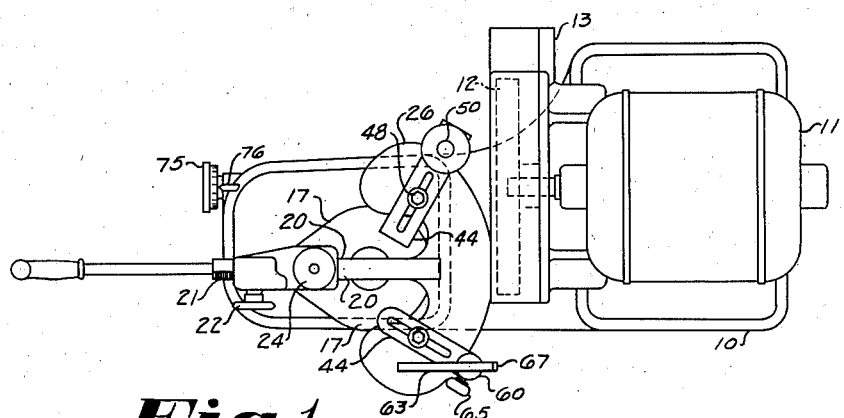
Fig. 1 is a plan view of a device incorporating this invention.
Figure 2:
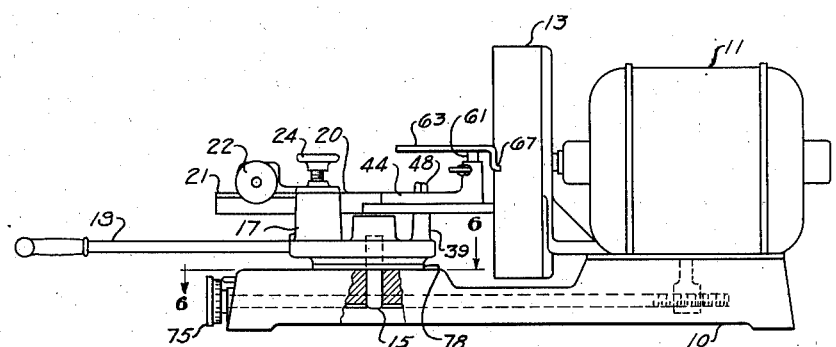
Fig. 2 is a side view thereof.

Having reference now, more specifically to Figs. 1 and 2, mounted upon a base 10 is a motor 11 for rotating an abrasive surface or wheel 12 within a dust accumulator 13. Means, hereinafter described, are provided for moving the abrasive surface from a zero position towards and away from the brake shoe lining.

The base is provided with a plurality of openings 15 which are at various and predetermined distances from the abrading surface. These openings lie in one or more lines which are disposed at an angle, preferably not a right angle, to the abrading surface.

Rotatably mounted on the base is a platform 17 from the bottom of which projects a pin 18 adapted to be received by any of the openings 15. A lever 19 is provided for readily pivoting the platform about the axis of any preselected one of said openings.

Mounted for rectilinear reciprocating movement on the platform is a beam 20 which carries a rack 21 in mesh with a pinion which is rotated by a handwheel 22. For locking the beam relatively to the platform a set screw actuated by a handwheel 24 is provided.

Figure 3:
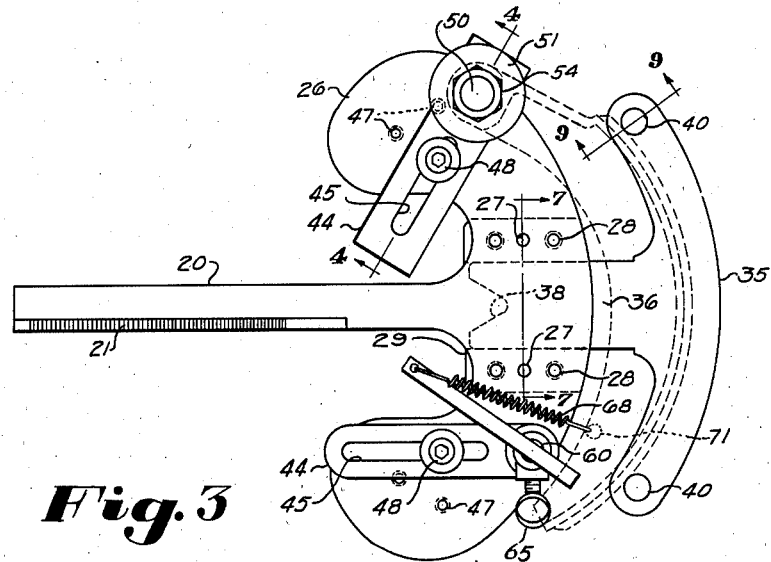
Fig. 3 is an enlarged plan view of brake shoe supporting mechanism constructed in accordance with this invention.
Figure 7:
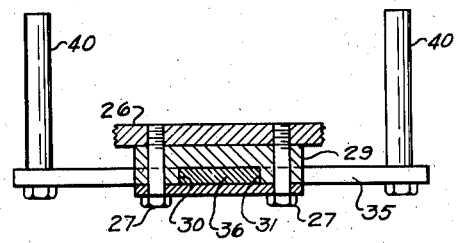
Fig. 7 is a section taken along the line 7—7 of Fig. 3.

The brake shoe supporting means proper will now be described and reference is made particularly to Figs. 3, 4 and 5. The beam 20 terminates in an arcuate plate 26 which has secured to the bottom thereof, as by dowel pins 27 and bolts 28, a grooved plate 29, see Figs. 3 and 7, for accommodating brake shoe locating means 35. The two opposite sides 30 and 31 of this groove are parallel to and equidistant from a line passing through the axis of the pin 18.

The brake shoe locating means 35 has a radially inwardly extending tongue 36 which slidingly and snugly is accommodated in said groove. This tongue is provided with a recess 38 which permits the inner end thereof to be moved inwardly beyond a boss 39, which serves as a support for the beam 20. Extending upwardly from the brake shoe locating means 35 is a pair of fingers 40 which are equally distant from the said line which passes through the pin 18.

Figure 8:
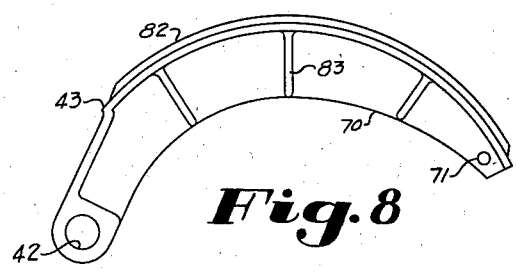
Fig. 8 is a plan view of a conventional cast brake shoe.
Figure 6:
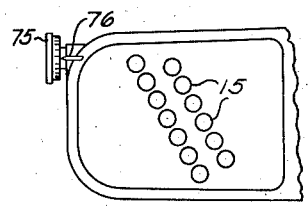
Fig. 6 is a section taken along the line 6—6 of Fig. 2.

As is seen in Fig. 8, cast brake shoes are usually provided with a cylindrical opening 42 the axis of which is parallel to the axis of the axial machined cylindrical brake lining bearing surface 43 of the brake shoe. The brake lining is identified by the numeral 82, the radial flange by 70, and the reinforcing rib by 83.

Supported by the plate 26 at each end thereof is an arm 44 which is provided with a slot 45 through which projects a bolt 46 adapted for being threadingly received by any one of a plurality of apertures 47.

Figure 5:
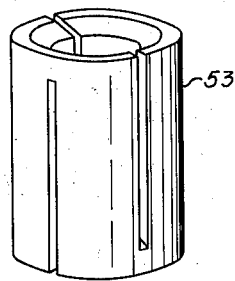
Fig. 5 is a perspective view of one element of the brake shoe mounting means.
Figure 4:
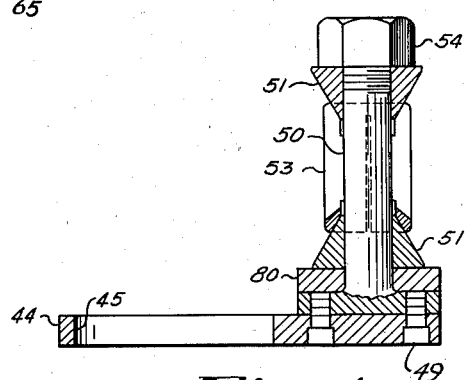
Fig. 4 is a section taken along the line 4—4 of Fig. 3.

Means for securing the brake shoe to one of the arms 44 are provided and are best seen in Figs. 4 and 5. Such means are, by bolts 49, secured to an arm 44 and comprise an upwardly projecting stud 50, a pair of frustro-conical washers 51, expanding collet 53 which is interposed between the conical washers and a nut 54 for forcing the washers 51 towards each other and consequently expanding both ends of the collet.

The other of said arms 44 is provided with an annularly bored boss 60 for accommodating a stud 61 which projects downwardly from what is conventionally called "a hold back." For maintaining the stud in any desired position a thumb screw 65 is provided. The "hold back" comprises an arm 63 which is provided with a ledge 67 for supporting a brake shoe and is also provided with a spring 68 for holding back the brake shoe on the ledge.

*Operation*

By manipulating the handwheel 22 and pivoting of the platform 17, the plate 26 is spaced from the abrading surface sufficiently to permit insertion of the tongue 36 into the said groove which is formed by the plate 28. The opening 42 of the brake shoe is placed around the collet 53 while the latter is contacted and the radial flange 70 of the brake shoe is placed upon the ledge 67. The brake drum engaging surface of the brake lining is then brought into contact simultaneously with each of the fingers 40 and after proper selection of the holes 47 each of the arms 44 is secured to the plate 26 and the collet is expanded by tightening the nut 54. The thumb screw 65 is then set for maintaining the shoe and properly located and held back upon the ledge 67, the spring 68 is connected to one of the holes 71 in the radial flange of the brake shoe. At this point, the set up is complete and elements will appear substantially as shown in Fig. 3, wherein the brake shoe is indicated by dotted lines.

After the brake shoe is secured in position the brake shoe locating means 35 is removed so as to prevent its contacting the abrading surface.

It is thus seen that the perpendicular bisector of a line connecting the two points of the brake lining which are contacted by the finger 40 will pass through the pin 18, and that by pivoting the platform 17 about the axis of any preselected opening 15 the ground brake shoe lining radius is a function of the distance of such opening from the abrading surface and is not dependent on the position of the beam 20 on the platform. The said predetermined distances are determined by the various standard radii of brake linings. From this it follows that by proper selection of one of the openings 15 the original radius of the brake lining can be produced. It is to be noted, that since the distances are predetermined, the arm 20 may be actuated without effecting the ultimate radius to which a particular brake lining will be ground. By locating the openings 15 on lines which are not disposed at right angles with respect to the radial face of the abrading surface, they are spaced in a direction parallel thereto and a larger area of such surface can be utilized than would be possible if the holes were located on lines perpendicular to the abrading surface and consequently loading of such surface is retarded.

In order to compensate for wear of the abrasive surface, the motor as above indicated is movably mounted and to this end a hand wheel 75 actuates a threaded shaft which is engaged by a nut carried by the motor. Suitable indicia means 76 indicate when the abrasive surface is at its original position relatively to the openings 15, i. e. the zero position, and also indicate the amount of departure therefrom.

For spacing the platform from the base, a suitable number of plates 78 is provided, each having an opening for accommodating the pin 18.

For spacing a brake shoe above the plate 26 on the collet 53, a suitable number of washers 80 may be provided.

It is thus seen that a device constructed in accordance with this invention will effectively and accurately locate and maintain brake lining secured to a brake shoe in abrading relation with an abrasive surface and will utilize a greater portion of said surface than devices of the type identified heretofore produced.

Figure 9:
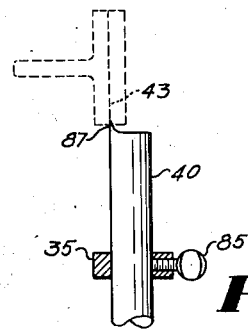
Fig. 9 is an enlarged section taken along the line 9—9 of Fig. 3 and illustrates a modification thereof.

In the alternative construction illustrated in Fig. 9, the fingers 40 are axially movable relatively to the location means 35 and are keyed against relative rotation with respect thereto. A set screw 85 is provided for maintaining the fingers in any desired degree of axial adjustment. The upper end of each finger is provided with a sharp projection 87 which is adapted for engaging the machined brake lining engaging surface 43 of the brake shoe. If the lining completely covers such surface, then the projection 87, being sharp or pointed, will separate the lining therefrom so as to make a portion thereof available for such engagement. The essential difference between the preferred and the alternative brake shoe locating means is that the preferred locates relatively to the brake drum engaging surface while the alternative locates relatively to the brake lining engaging surface.

It is to be noted, however, that the brake shoe without lining may be located and mounted upon the device to secure the set-up, then removed, lined, remounted without relocating and then ground. Thus either construction might be used for locating relatively to the surface 43.

Figure 10:
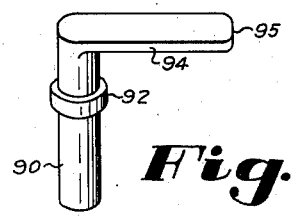
Fig. 10 is a perspective view of an element constituting part of this invention.

Means are illustrated in Fig. 10 for reestablishing the zero or original position of the abrasive surface relative to the openings 15 and are adapted for reception by any one of the openings, preferably the one closest to the abrasive surface, and space the abrasive surface therefrom. Such means comprise a pin 90, the lower portion of which is snugly received by the said preferable opening. A flange 92 rests on the edge of the opening and spaces the same from the top end of the pin. This top end has projecting therefrom an arm 94, the forward end 95 of which is rounded. The distance from the axis of the pin to the end 95 of the arm is the distance from the axis of said opening to the zero position of the abrasive surface. Thus, by moving the abrasive surface until the same just contacts the end 95, the zero position can be readily established.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a device of the character described, the combination of an abrasive surface, brake shoe supporting and clamping means adapted for pivoting relatively thereto, said means presenting a guideway parallel to a line through the axis about which said means pivots, and rigid means cooperating with said guideway for locating a brake shoe upon said first-named means, said last-named means comprising an element presenting a pair of brake lining engaging fingers so located that said line is the perpendicular bisector of a line connecting said fingers.

2. In a device of the character described for grinding brake lining secured to a brake shoe, an abrasive surface, brake shoe supporting means pivotally movable with respect thereto, and means engaging the brake lining engaging surface of said brake shoe in the presence of brake lining for locating the same relatively to said first-named means.

3. In a device of the character described for grinding brake lining secured to a brake shoe, an abrasive surface, means for supporting a brake shoe in abrading relation therewith and means for separating the brake lining from the brake shoe and for engaging the brake lining surface of the brake shoe for locating the brake shoe relatively to said first-named means.

4. In a device of the character described, the combination of an abrading surface, means for rotatably supporting a brake shoe in abrading relation therewith, said means having a guideway and an obstruction, and means for locating said brake shoe on said first-named means, said last-named means having a tongue adapted for engaging said guideway, the inner end of said tongue being cut out whereby said inner end may clear said obstruction.

5. In a device of the character described, the combination of an abrasive surface, a brake shoe supporting platform rotatable relatively thereto, and horizontally and vertically adjustable spring and abutment means carried by said platform for engaging and maintaining a brake shoe in abrading relation with said abrading surface.

6. In a device of the character described, the combination of a base having an opening therein, an abrasive surface movable with respect thereto, means pivotal with respect to said base for maintaining a brake shoe in abrading relation with said abrasive surface, and spacer means receivable by said opening and adapted for engaging said abrasive surface for locating said abrasive surface with respect to said base.

7. In a device of the character described for grinding brake lining secured to a brake shoe, an abrasive surface, means for supporting a brake shoe in abrading relation therewith and means for engaging the brake lining adjacent surface of said brake shoe in the presence of brake lining for locating the same relatively to said first named means.

8. In a device of the character described for grinding brake lining secured to a brake shoe, an abrasive surface, means for supporting a brake shoe in abrading relation therewith, and means comprising an element having a sharp projection adapted for engaging the brake lining adjacent surface of the brake shoe in the presence of brake lining for locating the brake shoe relatively to said first-named means.

9. In a device of the character described, the combination of a base, an abrasive surface supported by said base, a brake shoe supporting platform rotatably supported by said base, a vertically adjustable element pivotally carried by said platform and presenting an abutment adapted for engaging a brake shoe, and resilient means for urging a brake shoe against said abutment whereby a brake shoe is maintained in abrading relation with said abrasive surface.

10. In a device of the character described, the combination of a base, an abrasive surface supported by said base, a brake shoe supporting platform rotatably supported by said base, a horizontally and vertically adjustable arm carried by said platform and presenting a ledge for engaging a brake shoe, and a spring one portion of which engages said arm and the other portion of which is adapted for engaging a brake shoe for holding back the latter on said ledge.

11. In a device of the character described, the combination of an abrasive surface, a platform for rotatably supporting a brake shoe in abrading relation therewith, a horizontal abutment vertically adjustable relatively to said platform and adapted to abut a brake shoe, a vertical abutment carried by said platform and a spring for maintaining a brake shoe in abutting relation with said vertical abutment while the brake shoe abuts said horizontal abutment.

12. In a device of the character described, the combination of a base, an abrasive surface carried by said base, a platform rotatably carried by said base, clamping means carried by said platform for clamping a brake shoe in abrading relation with said abrading surface, said platform presenting a groove which if extended would pass through the axis about which said platform is adapted to pivot, and brake shoe locating means presenting a tongue adapted to be removably received by said groove and including a pair of points which lie on a line the perpendicular bisector of which passes through said axis when said tongue is received by said groove, said points being adapted for engaging brake lining while the latter is secured to a brake shoe for locating the latter in position to be clamped by said clamping means with the center of said brake shoe on said axis.

JOHN Y. BLAZEK.